United States Patent
Saad

(10) Patent No.: US 10,445,810 B1
(45) Date of Patent: *Oct. 15, 2019

(54) EXPERT SYSTEMS RECOMMENDATIONS ACCESSING CONSUMER ACCOUNT INFORMATION AND PRODUCT SUPPLIER DATA

(71) Applicant: Ihab L. Saad, Huntington, NY (US)

(72) Inventor: Ihab L. Saad, Huntington, NY (US)

(73) Assignee: Expert Logic Holdings, Inc., Clearwater, FL (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/778,374

(22) Filed: Feb. 27, 2013

Related U.S. Application Data

(63) Continuation-in-part of application No. 13/413,340, filed on Mar. 6, 2012, now Pat. No. 8,407,106, which is a continuation of application No. 10/459,956, filed on Jun. 12, 2003, now Pat. No. 8,155,577.

(60) Provisional application No. 60/389,867, filed on Jun. 19, 2002.

(51) Int. Cl.
  *G06Q 30/00* (2012.01)
  *G06Q 30/06* (2012.01)

(52) U.S. Cl.
  CPC ............... *G06Q 30/0631* (2013.01)

(58) Field of Classification Search
  CPC . G06Q 30/0631; G06Q 30/0613–0619; G06Q 30/0277
  USPC ...... 434/318, 350; 705/26.7, 14.49; 704/270
  See application file for complete search history.

(56) References Cited

U.S. PATENT DOCUMENTS

| | | | |
|---|---|---|---|
| 6,321,221 B1 * | 11/2001 | Bieganski | 705/26.7 |
| 6,904,408 B1 * | 6/2005 | McCarthy et al. | 705/2 |
| 2001/0021914 A1 * | 9/2001 | Jacobi et al. | 705/8 |
| 2007/0184425 A1 * | 8/2007 | Packard et al. | 434/350 |

(Continued)

OTHER PUBLICATIONS

J.D. Roth, How to Use the Amazon Marketplace for Fun and Profit, Sep. 23rd, 2007 http://www.getrichslowly.org/blog/2007/09/23/how-to-use-the-amazon-marketplace-for-fun-and-profit/.*

(Continued)

*Primary Examiner* — Samchuan C Yao
*Assistant Examiner* — Michael C Humphrey
(74) *Attorney, Agent, or Firm* — Shaddock Law Group, PC

(57) ABSTRACT

A product recommendation expert system including a server; at least one consumer computer that is linked, via a distributed network, to the server; and at least one management computer that is linked, via a distributed network, to the server; wherein the server includes at least some of a product profile database for storing and/or updating product information for a plurality of products, a criteria database for storing and/or updating evaluation criteria by which a product is evaluated, and at least one first consumer profile database for storing and/or updating consumer profile information for a plurality of consumers; and at least one second consumer profile database, wherein the second consumer profile database contains at least some previously stored, supplemental consumer profile information, wherein the supplemental consumer profile information includes at least some consumer profile information that is different from the consumer profile information in the first consumer profile database.

18 Claims, 4 Drawing Sheets

(56) References Cited

U.S. PATENT DOCUMENTS

2009/0248599 A1* 10/2009 Hueter ................ G06Q 10/00
706/20
2013/0246174 A1* 9/2013 Davidson ........... G06Q 30/0631
705/14.53

OTHER PUBLICATIONS

Educational Technology Publications (Ed.). 1990. Expert Systems and Intelligent Computer-Aided Instruction. Educational Technology Publications, Englewood Cliffs, NJ, USA. <https://books.google.com/books/about/Expert_Systems_and_Intelligent_Computer.html?id=ROA3s8ZBnrQC>.*

* cited by examiner

400

Purchase Report for John Smith
Date: September 25, 2007

Category: Health & Fitness  Status:  ⦿ Incomplete
                                     ○ Complete
Assignment:                          ⦿ Not Purchased
                                     ○ Purchased
Product(s) Used:

Objective:

Process Used:

*FIG. 4*

EXPERT SYSTEMS RECOMMENDATIONS ACCESSING CONSUMER ACCOUNT INFORMATION AND PRODUCT SUPPLIER DATA

CROSS-REFERENCE TO RELATED APPLICATIONS

This application claims the benefit of co-pending U.S. patent application Ser. No. 13/413,340, filed Mar. 6, 2012, U.S. patent application Ser. No. 10/459,956, filed Jun. 12, 2003, now U.S. Pat. No. 8,155,577, and U.S. Provisional Application Ser. No. 60/389,867, filed Jun. 19, 2002, the disclosures of which are incorporated herein by reference in their entireties.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE INVENTION

1. Field of the Invention

This invention relates generally to the field of providing product recommendations to specific individual consumers based on a consumer's profile information and product evaluation information.

2. Description of Related Art

When a consumer purchases an item on the Internet, it is generally known for the seller to suggest one or more additional products to the consumer, based on correlations to what other buyers, purchasing the same item have also purchased.

BRIEF SUMMARY OF THE INVENTION

Related art has inherent limitations, in that all product (or service) options do not compete on level playing field; recommendations are highly based on consumer-to-consumer compatibility and product popularity as inferred by multi-user ratings. Prior methods process historical data indicative of the users' affinities for particular items to identify correlations between interests of users "(e.g. items A and B are similar because a large portion of those who selected A also selected B)." Prior art relates to methods for predicting the interests of individual users based on the known interests of a community of users.

Further, related art implements the "law of averages," in essence "follow the herd" mentality, to reach "common ground;" more specifically associative relationships between multiple users, rather than focus on the specific individual consumer. Therefore, prior art does not allow for "optimally individualized" outcomes, as opposed to expert systems, which result in customized "consumer reports" and/or "personal shoppers," employing in-house/industry authority/consultant, and or trusted source, rather than incorporating community collaboration. In fact, preparing and priming the expert system do not require any shopping, rather operating only on access to consumer and product (or service) profiles; expert systems provide one-on-one direct user interface and private interaction with results on the very first user. Finally, this invention proposes user-to-product ranking/scale/score "Best-Fit" (BF) "Recommendation Suitability" (RS), rather than "Commonality Index (CI)," which indicates relatedness of one item to the other, based on sales of the respective items.

The systems and methods of this invention utilize a product recommendation expert system, which provides consumers with product recommendations based upon the consumer's profile information and expert product evaluation information. The features of this invention maintain and/or consolidate consumer information, such as, for example, profiles, reports, and scores in one integrated and interactive personal data management system.

This invention applies "causal theory," as opposed to traditional correlative techniques, to provide, product (or service) suggestions and/or recommendations, customized for the specific individual consumer. Causation requires decision expertise, such as feedback loops and filtering relationships, as per the efficiency and/or effectiveness of particular product parameters, that is, attributes and benefits with respect to the evaluation information. Conversely, correlation relies on historical information, such as previous product (or service) purchases and user ratings, through collaborative filtering by community of users.

This invention is based on expert-systems' assessment through biased and qualitative understanding of the specific individual consumer. Conversely, prior related art provides suggestions through unbiased and quantitative analyses of the user populations; recommendations are likely items previously selected by the user, either viewed, purchased, or placed in an "electronic shopping cart." Item-to-item mappings periodically analyze user history to identify correlations between purchases among current and/or recent user's (i) purchase histories, (ii) item ratings, (iii) contents of the personal shopping cart(s), (iv) items removed from personal shopping cart(s).

In various exemplary embodiments, the systems and methods of this invention facilitate the selection and purchase of specific resources, products, goods, or services. In other exemplary embodiments, the systems and methods of this invention may be utilized by third parties or other consumers (i.e., friends, family, etc.) to select specific resources, products, goods, or services for someone else, another consumer. These systems and methods provide consumers with recommendations specifically tailored to each individual consumer, thereby reducing time and labor-intensive research required to identify and/or purchase an appropriate resource, product, good, or service.

In certain exemplary, nonlimiting embodiments, the profiling feature presents a consumer with a series of questions regarding the consumer, some optional and some necessary, to be completed by the consumer. The questions and responses are effectively weighted based on predetermined factors, such that information that is more relevant to, for example, suggesting an appropriate product for the consumer (such as questions regarding the consumer's special needs or health and fitness level) are given greater weight than personal identification information (such as the consumer's name and mailing address).

In certain exemplary, non-limiting embodiments, the profiling feature allows a consumer to identify locations of data specific to the consumer, so that that data can be accessed, analyzed, and used to automatically populate the consumer's profile. A consumer may indicate that the consumer has one or more accounts with third party online social networks or online marketplace platforms, such as: a Facebook account, a Twitter account, an eBay account, an Amazon.com account, a LinkedIn account, a MySpace account, and a Match.com account (Facebook, Twitter, eBay, Amazon.com, LinkedIn, My Space, and Match.com are trademarks of their respective owners and are not trademarks of the applicant). The systems and methods of this invention are then given access to those accounts so as to be able to mine data in those accounts to create the consumer's profile. For example, the consumer's Facebook profile may include the consumer's birthday and current address; the Match.com profile may include the consumer's favorite color, a list of the consumer's hobbies and interests, and a list of the consumer's favorite movies and novels; the Amazon.com account may include (through the consumer's prior purchase history) information regarding the consumer's shirt, pants, and shoe sizes.

When the specific consumer information is retrieved (whether received as a direct input from the consumer or based on mining of data from other consumer accounts and/or profiles), the information is used to create a specific consumer profile, which is then stored in a database and used to select products that are particularly suited to the specific consumer. If certain pieces of profile information are not available in pre-existing accounts and/or profiles, that supplemental information can be requested from the consumer.

Because the systems and methods of this invention are able to be accessed and utilized over a network, such as, for example, the Internet, consumers also have a community outreach feature, which allows them to communicate with other consumers via e-mail and messaging, and through public and private chat rooms and/or clubs. Consumers or groups of consumers may, for example, participate in polls, learn important factual points, discuss their impressions of products, and/or receive feedback from sponsors, manufacturers, or other parties.

The reporting feature provides a series of reports for each consumer. A consumer may download documents for printing and submission to, for example, suppliers, retailers, or other consumers.

According to certain exemplary, nonlimiting embodiments of this invention, if a consumer's age, gender, physical characteristics, interests, skill level, known learning disabilities, and other preferences are provided, the systems and methods of this invention may weigh the age, gender, physical characteristics, interests, and skill level information more heavily than the known learning disabilities and other preferences information for a given product. The specific consumer profile is then used to match the consumer to recommended products (also weighted to the specific consumer profile information) for that consumer, based on the specific consumer profile and expert product evaluation. This virtually eliminates the need for the consumer to perform complex analysis of the consumer against the various available products.

BRIEF DESCRIPTION OF THE SEVERAL VIEWS OF THE DRAWINGS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a basis for the claims and as a representative basis for teaching one skilled in the art to employ the present invention.

The exemplary embodiments of this invention will be described in detail, with reference to the following figures, wherein like reference numerals refer to like parts throughout the several views, and wherein:

FIG. 4 shows one exemplary format of a template for displaying assignment data, in a predetermined format.

DETAILED DESCRIPTION OF THE INVENTION

For simplicity and clarification, the operating principles, design factors, and layout of the product recommendation systems and methods, according to this invention, are explained with reference to various exemplary embodiments of the product recommendation systems and methods, according to this invention. The basic explanation of the operation of the product recommendation systems and methods is applicable for the understanding and design of the constituent components and steps employed in the product recommendation systems and methods according to this invention.

Furthermore, it should be understood that, although the various exemplary embodiments described herein are described with reference to product expert recommendation systems and methods, this is merely for simplicity and clarification of the systems and methods of this invention. Therefore, it will be apparent to one of ordinary skill in the art that the systems and methods described herein are not to be construed as limited to a particular resource, product, good, or service, but can be used in conjunction with any resources, products, goods, or services and are not limited to any particular field of interest. For example, the method for recommending products based on a specific consumer profile may be used to recommend any resource, product, good, or service to a consumer based on a specific consumer profile and/or product parameter.

It should also be appreciated that the terms "resources", "products", "goods", and "services" are used for basic explanation and understanding of the operation of the systems, methods, and apparatuses of this invention. Therefore, it should be understood that the terms "resources", "products", "goods", and "services" can be used interchangeably and are not to be construed as limiting the systems, methods, apparatuses, and/or applications of this invention.

Figure 1:
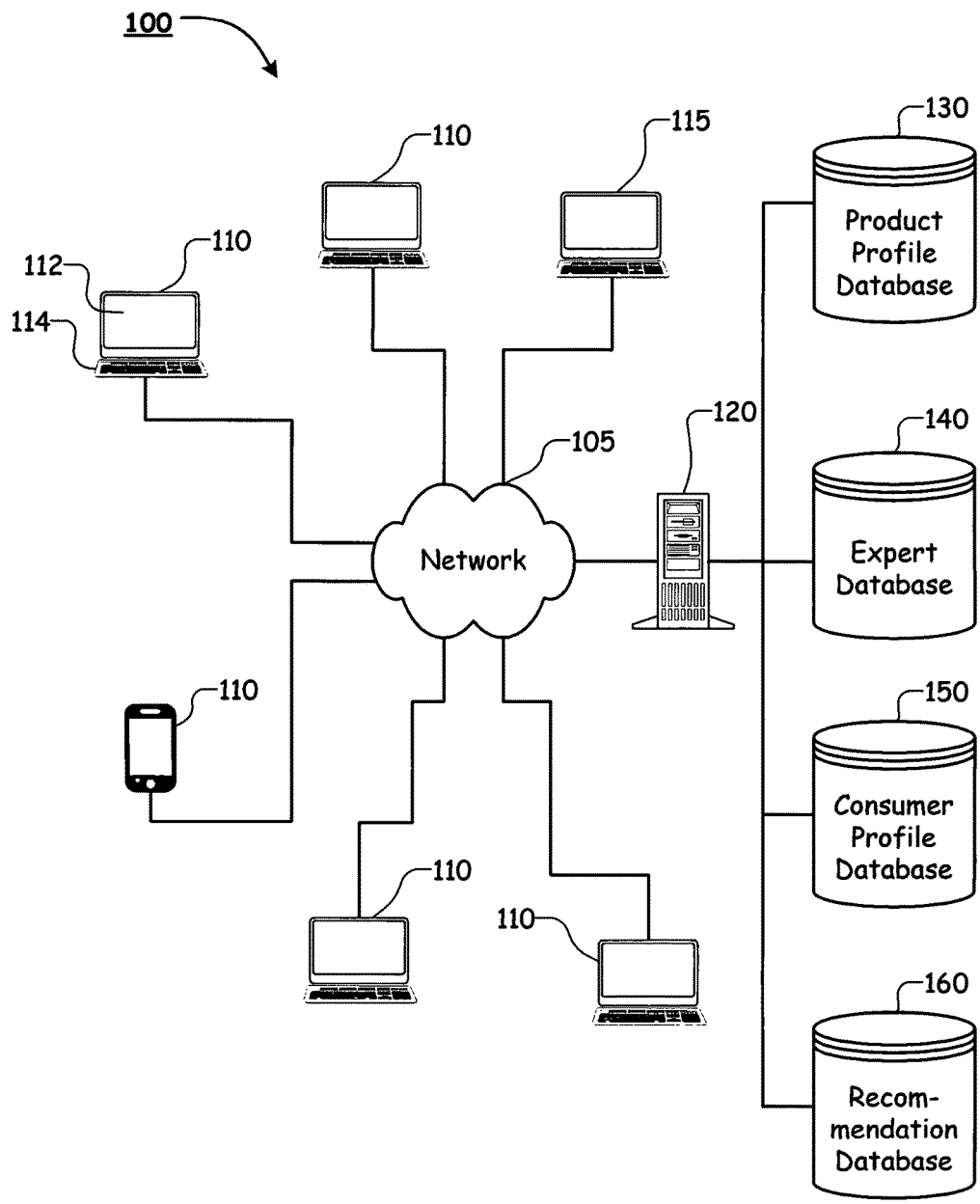
FIG. 1 shows a functional block diagram outlining a first exemplary embodiment of a product recommendation expert system according to this invention.

Turning now to the drawing figures, FIG. 1 is a functional block diagram outlining a first exemplary embodiment of a product recommendation system 100 according to this invention. As shown in FIG. 1, the product recommendation system 100 includes at least some of at least one consumer computer 110, a management computer 115, and a server 120. In various exemplary embodiments, the product recommendation system 100 includes a plurality of consumer computers 110. Each consumer computer 110 is linked, either directly or indirectly, to a distributed network 105, and, in turn, to the server 120. The management computer 115 is also linked, either directly or indirectly, to the distributed network 105, and, in turn, to the server 120.

In various exemplary embodiments, the distributed network 105 is, for example, an intranet, an extranet, the Internet and, more particularly, the World Wide Web portion of the Internet, a Local Area Network (LAN), a Wide Area Network (WAN), or any other presently known or later developed distributed network. It should be appreciated that, in various exemplary embodiments, the distributed network 105 may be, for example, a particular node, such as, for example, a specific web page, of a larger distributed network.

In various exemplary embodiments, each of the consumer computers 110 and the management computer 115, is typically a personal computer, such as a Windows-based workstation, having a memory containing communications software and some form of Internet connectivity, such as a modem, a T-1 line, an Integrated Services Digital Network (ISDN) line, or the like. The communications software may be any software suitable for telecommunications, and preferably includes Internet browser software. The Internet connector may be used with the communications software for communication, via the distributed network 105, to the server 120, any other consumer computer 110, and/or the management computer 115.

It should be understood that at least one of the consumer computers 110 may be a commercially available "Web-TV" device, such as those currently available from Phillips Electronics, Magnavox, and Sony Corporation. Alternatively, at least one of the consumer computers 110 may be a Network Computer, a smart phone, a tablet, a personal digital assistant (PDA), a handheld organizer, or a similar or hybrid electronic device.

In various exemplary embodiments, each of the consumer computers 110 also includes a display 112 and one or more input devices 114. In various exemplary embodiments, the display 112 may be a cathode ray tube display, a liquid crystal display, or any other known or later developed system capable of displaying data. The one or more input devices 114 may be one or more of a keyboard, a mouse, a touch screen, a touch pad, a stylus, a microphone, a camera, or any other known or later developed device capable of inputting data into the consumer computer 110.

It should be appreciated that the management computer 115 may include any or all of the features of the consumer computer 110. However, the management computer 115 is not limited to the features included in any of the consumer computers 110.

In various exemplary embodiments, the server 120 is a programmed network server, and, more specifically, a server that supports a HyperText Transfer Protocol (http). The server 120 is capable of maintaining profile records, feedback documents and data, report documents and data, and consumer and/or consumer information, and other information, and transmitting such data and information, via the network 105, to an appropriate consumer computer 110 or the management computer 115. Many suitable software programs for interfacing the server 120 with the network 105 exist, including, for example, Netscape, Apache, Microsoft IIS, and O'Reilly.

It should be appreciated that the server 120 and/or the management computer 115 utilize sufficient security methods to ensure safe storage and integrity of data, documents, and information.

The server 120 is connected, via one or more linked connections, to at least some of a product profile database 130, an expert database 140, a consumer profile database 150, and a recommendation database 160.

The product profile database 130 includes various suitable software programs and memory for storing and/or updating a plurality of product profile records. In various exemplary embodiments, the product profile records contained within the product profile database 130 comprise both static, objective product information and subjective, product evaluation information regarding each of a plurality of products.

In various exemplary embodiments, the objective product information includes, but is not limited to, each product's name or title, technical specifications, size or dimension, manufacturer, distributor, supplier, price, compatibility or equipment requirements (such as computer memory, input device, or operating system compatibility for computer software products), availability, and the like. The objective product information may also include a technical description of the product and certain product keywords.

It should be appreciated that the type and level of objective product information in the product profile database 130 may vary and may be updated periodically, as appropriate or necessary. The objective product information is typically updated by the product's manufacturer, supplier, or distributor.

In various exemplary embodiments, the product evaluation information includes, for example, more subjective information regarding each individual product, such as, for example, whether the product has a particular religious orientation or contains religious content, and if so, what religion, whether the product is suitable for consumers with particular physical, mental, or emotional handicaps, and if so, what handicaps, whether the product is suitable for consumers with remedial, average, or advanced learning abilities, whether the product requires that the consumer be able to read, whether the product is more suited for an institutional or a home setting, whether the product is suited for a consumer following a self-paced consumption, whether the product is considered interactive, an evaluation of the consumer style supported by the product, and the like.

In various exemplary embodiments, the product evaluation information includes, for example, answers to at least some of the product evaluation questions shown below in TABLE I. It should be appreciated that the product evaluation questions, as listed in TABLE I, are merely exemplary, and are not intended to be an exhaustive list of possible questions. Specific product evaluation questions may be created or deleted based on a particular application.

TABLE I

What is the product category? (i.e., Electronic, Hardware, Health & Fitness, Software, or Other)
What age, if any, does the product target?
What state/region does the product target?
What gender does the product target?
This product is appropriate for the consumers in which environments? (i.e., Home, Institution, Private, or Public)
What is the format of the primary product? (i.e., Audio Cassette, Audio CD, Computer CD-ROM, Computer Floppy Disk, DVD Player, or Paper/Book, VCR)
What is the format of the supplemental components? (i.e., Audio Cassette, Audio CD, Computer CD-ROM, Computer Floppy Disk, DVD Player, or Paper/Book, VCR)
What consumer capability does the product target? (i.e., Advanced, Moderate, or Remedial)
Does the product require consumers to be self-paced?
Does the product require use of a computer keyboard?
Does the product require use of a computer mouse?
What proficiency level does the product require relative to that of age level? (i.e., Low, Medium, or High)
Is the product interactive?
Is the product competitive?
Is the product specifically beneficial for consumers with disabilities? (i.e., Attention Deficit, Auditory, Muscle Control, Visual, or Other)
What style does the product target? (i.e., Demonstration/Example, Discovery/Exploratory, Hands-on/Manipulative, or Rote-Learning/Skill-Based)
Is the product not recommended for consumers with disabilities? (i.e., Attention Deficit, Auditory, Muscle Control, Visual, or Other)
Does the product contain content specifically appropriate for consumers with religious orientations? (i.e., Christian, Jewish, Muslim, or Other)
Does the product contain content specifically inappropriate for consumers with religious orientations? (i.e., Christian, Jewish, Muslim, or Other)
Is the product entirely computer-based?
Is the product enhanced with a computer?
What operating system is the product compatible with? (i.e., Windows 95, Windows 98, Windows 2000, Windows ME, Windows NT, Mac 8x, or Mac 9x)
Does the product require Internet access? (i.e., Dial-Up Access, High Speed, or No Access)
If the product requires Internet access, what services does it provide? (i.e., Chat, Instruction, Performance, Training, or Support)

It should be appreciated that the type and level of product evaluation information in the product profile database 130 may also vary, and is typically updated in accordance with the systems and methods of this invention.

It should also be appreciated that specific information may be classified as objective product information, product evaluation information, or both, and the classification of a specific piece of information as objective product information, product evaluation information, or both may vary based on, for example, the specific application for which the product is being evaluated, or the level or reliability of information provided by a manufacturer or supplier.

The expert database 140 includes various suitable software programs and memory for storing and/or updating criteria by which a product is evaluated by the systems and methods of this invention. For example, the expert database 140 may include information as to whether products or services should be evaluated for specific content, are included on a preferred supplier list, are well suited for a consumer with an advanced ability, are usable in a home setting, are for a consumer following a self-paced consumption, and the like.

The consumer profile database 150 includes various suitable software programs and memory for storing and/or updating a plurality of consumer profile records or consumer profile information. In various exemplary embodiments, the consumer profile records contained by the consumer profile database 150 comprise both consumer personal information and consumer performance information for each of a plurality of consumers. In various exemplary embodiments, the consumer personal information includes, for example, answers to at least some of the consumer questions shown below in TABLE II. It should be appreciated that the consumer questions, as listed in TABLE II, are merely exemplary, and are not intended to be an exhaustive list of possible questions. Specific consumer questions may be created or deleted based on a particular product expert system application.

However, it should be appreciated that the type and level of consumer personal information in the consumer profile database 150 may vary and may be updated periodically, as appropriate or necessary. The consumer personal information is typically updated by the consumer.

TABLE II

What is the consumer's age?
What is the consumer's date of birth?
What is the consumer's gender?
What are the consumer's interests and activities? (i.e., Crafts, Music, Sports, etc.)
What is the consumer's grade?
What is the consumer's spouse's name?
What is the consumer's Employer's name?
Employer City or Town?
Employer State and Country?
Which product category are of interest? (i.e., Electronic, Hardware, Health & Fitness, Health & Fitness, Software, or Other, etc.)
What is the consumer's environment? (i.e., Home, Institution, Private, or Public)
Do you have a computer for consumer use?
If yes, what operating system is the computer running? (i.e., Windows 95, Windows 98, Windows 2000, Windows Me, Windows NT, Mac 8x, Mac 9x, Mac 10, Linux, etc.)
In what year was the computer new?
If you have a computer, on a scale of 1 to 5, do you have access to the Internet?
If yes, are you interested in online services? (i.e., Chat, Instruction, Performance, Training, or Support, etc.)
Which of the following equipment do you have? (i.e., Audio Cassette, Audio CD, Computer CD-ROM, Computer Floppy Disk, DVD Player, VCR, etc.)
How would you characterize consumer's capability relative to his/her age level? (i.e., Advanced, Moderate, or Remedial)
How would you characterize consumer's reading of English relative to his/her age?
Is the consumer primarily self-paced?
On a scale of 1 to 5 - Does the consumer have basic keyboarding skills?
On a scale of 1 to 5 - Can the consumer navigate a computer screen with a mouse?
On a scale of 1 to 5 - Does the consumer prefer interactivity in the learning environment?
On a scale of 1 to 5 - Does the consumer work best in a competitive situation, like a video game?
Which of the following product formats does the consumer prefer? (i.e., Audio Cassette, Computer CD-ROM, DVD Player, Reader, Textbook, Video, Workbook, etc.)
For product category 1, which styles does the consumer prefer? (i.e., Demonstration/Example, Discovery/Exploratory, Hands-on/Manipulative, Rote-Learning/Skill-Based, etc.)
For product category 2, which styles does the consumer prefer? (i.e., Demonstration/Example, Discovery/Exploratory, Hands-on/Manipulative, Rote-Learning/Skill-Based, etc.)
For product category 2, which learning styles does the consumer prefer? (i.e., Informational, Rote-Learning/Skill-Based, etc.)
For product category 4, which learning styles does the consumer prefer? (i.e., Auditory/Phonetic or Visual/Sight-Based)
For product category 5, which learning styles do the consumer prefer? (i.e., Context/Literature-Based or Rote-Learning/Skill-Based)
Does the consumer have any of the following challenges? (i.e., Attention Deficit, Auditory, Muscle Control, Visual, etc.)
On a scale from 1 to 5 - Is it important that the product materials have an explicit religious orientation?
If it is important, what is your requested religious orientation? (i.e., Christian, Jewish, Muslim, etc.)

In various exemplary embodiments, the consumer personal information includes, for example, each consumer's individual performance information, report documents and data (such as scores or a consumer's overall rating in a particular product category), and the like. It should be appreciated that the type and level of consumer performance information in the consumer profile database 150 may also vary, and is typically updated more frequently than the consumer personal information. The consumer performance information is typically updated by the systems and methods of this invention and is capable of being transmitted to, for example, the consumer's computer 110 for display.

It should be appreciated that the consumer personal information in the consumer profile database 150 and the product information in the product profile database 130 contain similar types of information, such that the characteristics of the products may be matched to the characteristics of the consumer.

The recommendation database 160 includes various suitable software programs and memory for assessing a consumer's personal and/or performance information and developing and/or updating an individual consumer product based on the consumer's personal and/or performance information. The recommendation database 160 may also contain templates for displaying personal information, such as assignment data, in a predetermined format. An example of one exemplary format is shown in FIG. 4.

It should be appreciated that the information, such as personal or performance information may be displayed electronically or reduced to a printed format.

As shown in FIG. 1, the product profile database 130, the expert database 140, the consumer profile database 150, the recommendation database 160, or any other accessible database (not shown) may be implemented, individually, separately, or as complimentary components, using any appropriate combination of alterable, volatile, non-volatile, non-alterable, or fixed-memory. The alterable memory, whether volatile or non-volatile, can be implemented using any one or more of non-selectable or performance RAM, a floppy disk and disk drive, a writable or rewriteable optical disk and disk drive, a hard drive, flash memory or the like. Similarly, the non-alterable or fixed-memory can be implemented using any one or more of ROM, PROM, EPROM, EEPROM, an optical ROM disk, such as a CD ROM or DVD ROM disk, and disk drive or the like.

In various exemplary embodiments, the product profile database 130, the expert database 140, the consumer profile database 150, the recommendation database 160, or any other accessible database (not shown) store software and data used by the product recommendation system 100. The server 120 manages reading data from and writing data to the product profile database 130, the expert database 140, the consumer profile database 150, the recommendation database 160, or any other accessible database (not shown). The server 120 also drives the transmission of data to and the reception of data from each of the consumer computers 110 and the management computer 115.

Thus, in various exemplary embodiments, each of the consumer computers 110 and the management computer 115 is able to access, store, retrieve, and process information from any one or more of the product profile database 130, the expert database 140, the consumer profile database 150, the recommendation database 160, the distributed network 105, or any other accessible database (not shown). In this manner, it is not essential that any particular information be stored in the product profile database 130, the expert database 140, the consumer profile database 150, or the recommendation database 160. Alternatively, this information can be stored in, for example, management computer 115, the server 120, and/or the distributed network 105.

In various exemplary embodiments, the product recommendation expert system 100 will include software executing on the server 120. It should be appreciated that any other known or later developed system capable of processing and outputting data could be used in place of the server 120.

In the various exemplary embodiments described herein, each of the consumer computers 110, the management computer 115, the server 120 interface, for example, with the network 105, via a linked connection. Likewise, the product profile database 130, the expert database 140, the consumer profile database 150, and the recommendation database 160 interface, for example, with the network 105, via a linked connection.

The linked connections may be any known or later developed device or system for connecting any of the consumer computers 110, the management computer 115, the server 120, the product profile database 130, the expert database 140, the consumer profile database 150, the recommendation database 160, and/or the network 105, including a direct wired connection, a connection over a LAN, a WAN, or any other distributed network, a connection over the public switched telephone network, a connection over a coaxial cable (i.e., CATV) system, a connection over a cellular telephone network, a satellite connection or the like. In general, the linked connections may be any known or later developed connection system or structure usable to connect any of the consumer computers 110, the management computer 115, the server 120, the product profile database 130, the expert database 140, the consumer profile database 150, the recommendation database 160, and/or the network 105, including both wired and wireless connections.

Figure 2:
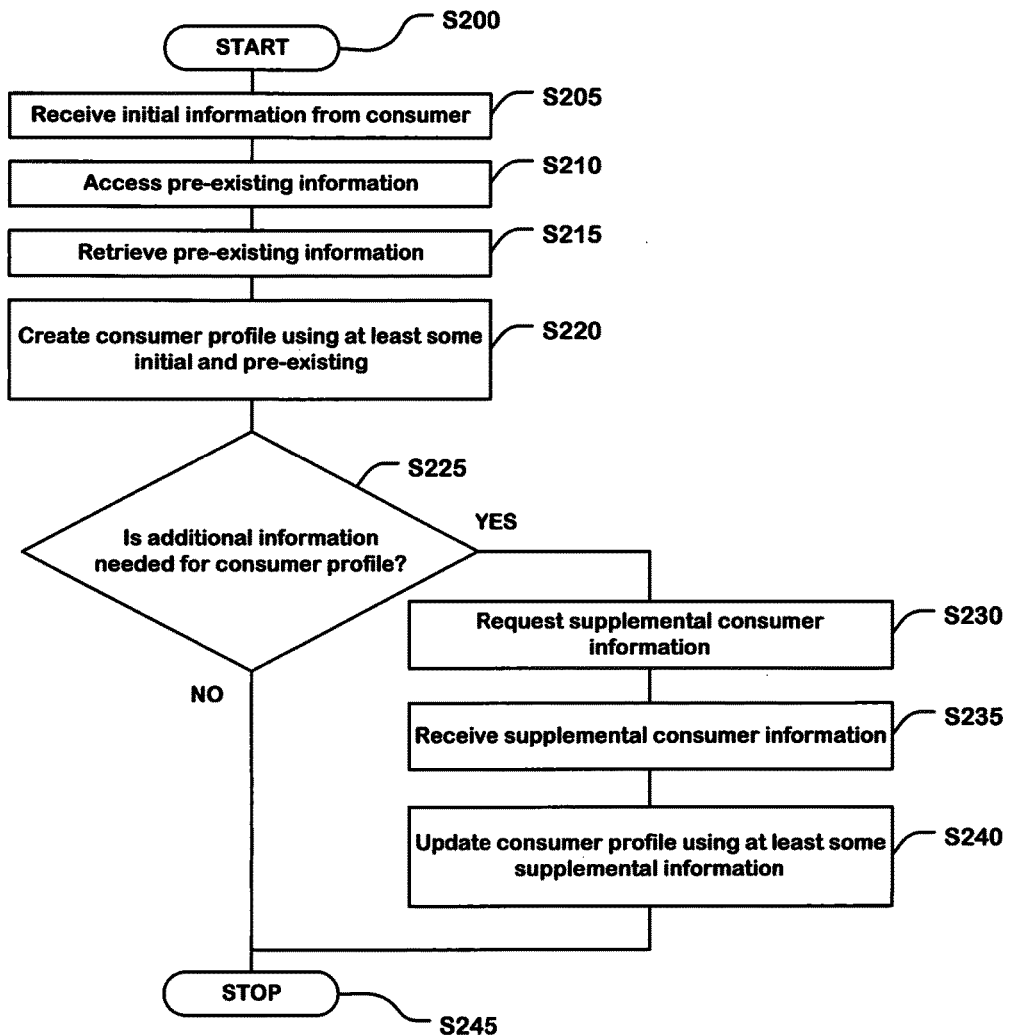
FIG. 2 shows a flowchart outlining one exemplary embodiment of a method for creating a consumer profile, according to this invention.

FIG. 2 shows a flowchart outlining one exemplary embodiment of a method for creating a consumer profile, according to this invention.

As shown in FIG. 2, beginning in step S200, the method begins and control continues to step S205, wherein at least some initial information is received from a consumer. The initial information may only include information regarding the consumer's name and information sufficient to allow the systems and methods of the present invention to access locations where pre-existing information regarding the consumer is stored are located. In certain exemplary embodiments, this initial information may include username and password or other access information to allow the systems and methods of the present invention to access and mine data from, for example, the consumer's Facebook account, Twitter account, eBay account, Amazon.com account, LinkedIn account, MySpace account, Match.com account, and the like.

Then, in step S210, the systems and methods of the present invention access the pre-existing information in the Facebook account, Twitter account, eBay account, Amazon.com account, LinkedIn account, MySpace account, Match.com account, or other accounts provided in the initial information. Control then continues to step S215.

In step S215, the pre-existing information is retrieved. Control then continues to step S220, where the pre-existing information is combined with the initial information to create a consumer profile.

Then, in step S225, a determination is made as to whether any additional information is needed for the consumer profile. In certain exemplary embodiments, the additional information includes information that could not be obtained from any of the identified consumer accounts. In various exemplary embodiments, this determination is made when the consumer selects a particular category or product to search. For example, until the consumer attempts to search for a pair of shoes, the consumer profile may not include or need to include information regarding the customer's shoe size.

If, in step S225 it is determined that additional information is needed for the consumer profile, control advances to step S230 and supplemental consumer information is requested from the consumer. Control then advances to step S235 and the supplemental consumer information is received from the consumer. Next, in step S240, the supplemental consumer information is added to the consumer profile to update the consumer profile.

Otherwise, if it is determined, in step S225, that additional information is not needed for the consumer profile, control jumps to step S245 and the method ends.

Figure 3:
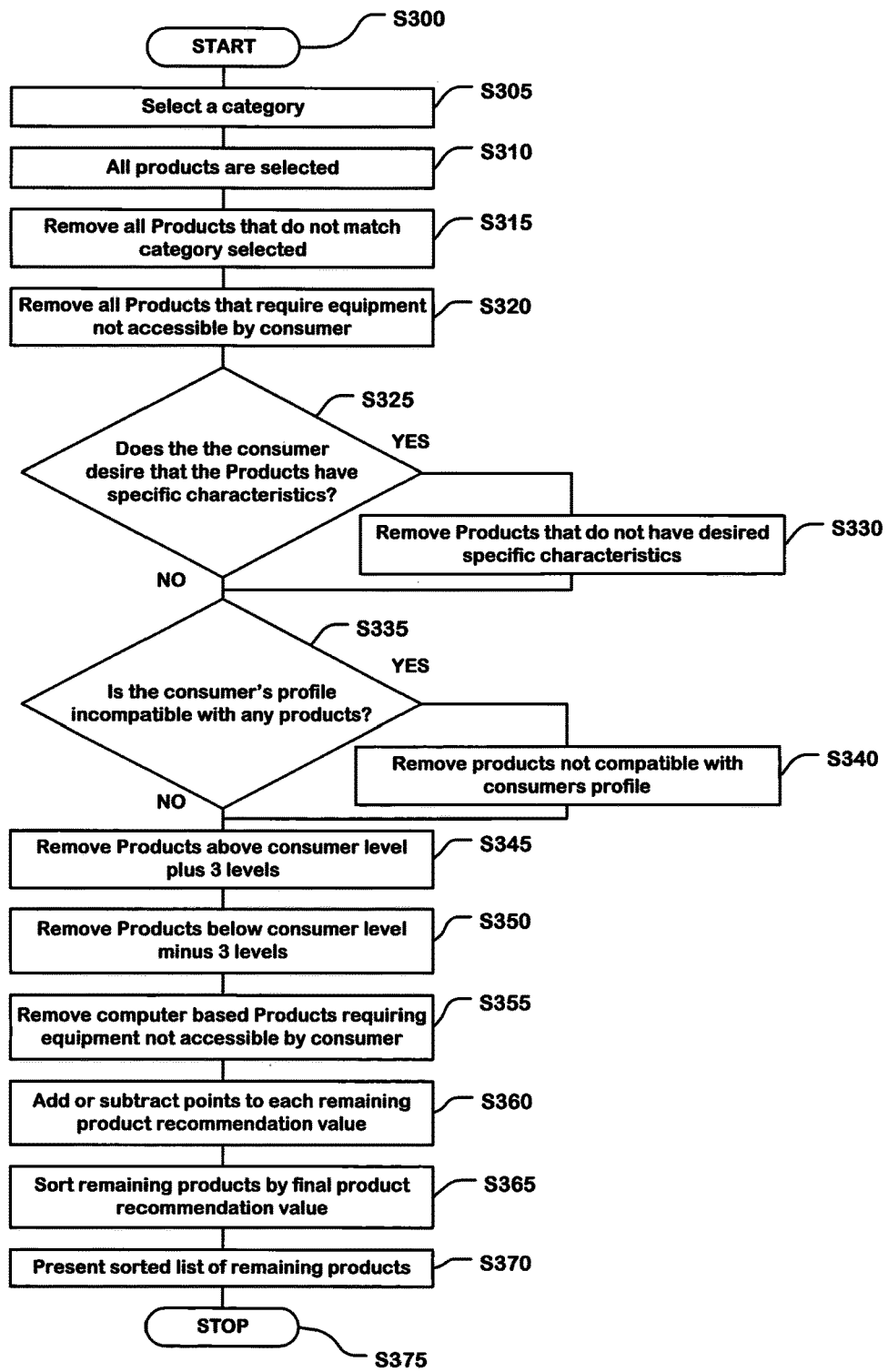
FIG. 3 shows a flowchart outlining one exemplary embodiment of a method for recommending products in a specific category, based on a specific consumer profile, according to this invention.

FIG. 3 shows a flowchart outlining one exemplary embodiment of a method for recommending products in a specific category, based on a specific consumer profile, according to this invention.

As shown in FIG. 3, beginning in step S300, the method begins and control continues to step S305, wherein a specific category is selected. Then, in step S310, all offered products are selected, regardless of the specific category selected. Control then continues to step S315.

In step S315, all of the products that are offered, which do not match the category selected, are removed from the list of selected offered products. Control then continues to step S320, where all of the remaining selected offered products that require equipment for use of the product that the consumer does not have access to (except for computer based products) are removed from the list of selected offered products. In various exemplary embodiments, information regarding the equipment that the consumer has access to is stored as specific consumer profile information in the consumer profile database 150.

Then, in step S325, a determination is made as to whether the consumer desires that the offered products include one or more specific characteristics. This may be accomplished, for example, by accessing information regarding the consumer's other preferences, if included in the specific consumer profile information stored in the consumer profile database 150.

If, in step S325 it is determined that the consumer desires that the offered products include one or more specific characteristics, control advances to step S330 and all of the products that are offered, which do not include the one or more specific characteristics, are removed from the list of selected offered products. This may be accomplished, for example, by accessing information regarding each product's specific content, as included in the objective product information or the product evaluation information stored in the product profile database 130 and comparing that information to the information included in the specific consumer profile information stored in the consumer profile database 150.

Otherwise, if it is determined, in step S325, that the consumer does not desire that the offered products include one or more specific characteristics, control jumps to step S335.

In step S335, a determination is made as to whether the consumer's profile renders the consumer incompatible with any of the products. This may be accomplished, for example, by accessing information regarding the consumer in the specific consumer profile information stored in the consumer profile database 150. It should be appreciated that incompatibility of a consumer to a product may be determined to be a mental, physical, preferential, geographic, or other incompatibility.

If, in step S335 it is determined that there is an incompatibility between the consumer and a product, control advances to step S340 and all of the products that are offered, which are incompatible with the consumer are removed from the list of selected offered products. This may be accomplished by accessing each product's objective product information or product evaluation information stored in the product profile database 130 and comparing that information to the information included in the specific consumer profile information stored in the consumer profile database 150.

Otherwise, if it is determined, in step S335, that none of the products are incompatible with the consumer, control jumps to step S345.

In step S345, all products that are designated to be a predetermined number of levels above the consumer's level, for example, the consumer's level plus 3 levels, are removed from the list of selected offered products. Then, in step S350, all products that are designated to be a predetermined number of levels below the consumer's level, for example, the consumer's level minus 3 levels, are removed from the list of selected offered products.

Then, in step S355, all offered products that are computer-based products, which require equipment not accessible by consumers (i.e., Mac based products for consumers with Windows based computers), are removed from the list of selected offered products.

Control then continues to step S360 and points are added to or subtracted from a product recommendation value for each of the remaining selected offered products. The points are added to or subtracted from each remaining product's product recommendation value based on predetermined criteria. These criteria are stored in the expert database 140, as described above, with reference to FIG. 1. In various exemplary embodiments, the predetermined criteria and the number of points to be added or subtracted for each predetermined criteria are as listed below in TABLE III. However, it should be appreciated that the predetermined criteria and the number of points to be added or subtracted for each predetermined criteria, as listed in TABLE III, are merely exemplary, and are not intended to be an exhaustive list of criteria. Specific predetermined criteria and associated point values may be created or deleted based on the particular expert system application.

When a final product recommendation value has been calculated for each of the remaining selected offered products, control continues to step S365.

TABLE III

Add points to each product from a preferred supplier list
Add points if product level matches consumers
Add points if product level is above consumers level
Add points if computer based product and consumer has computer
Add points if product and consumer match operating system
Add points if product and consumer are both 'remedial'
Add points if product and consumer are both 'advanced' ability
Add points if product and consumer environment match
Add points if product is computer based and consumer computer is less than 2 years old
Add points if product is internet based and consumer has any internet access
Add points if product is internet based and consumer has connection above 56k internet access
Add points if product and consumer match online service TABLE III-continued Add points if product does not require the consumer to read and consumer has low ability
Subtract points if product requires the consumer to read and consumer has low ability
Add points if match for self-pace or subtract 20 points if product not a match
Add points if match for keyboard or subtract 20 points if product not a match
Add points if match for mouse or subtract 20 points if product not a match
Add points if match for interactive or subtract 20 points if product not a match
Add points if match for compete or subtract 20 points if product not a match
Add points if match for style or subtract 50 points if product not a match
Add points if consumer is remedial and product level is below consumer
Add points if consumer is advanced and product level is above consumer In step S365, the remaining selected offered products are sorted by their final product recommendation value, such that the product or products with the highest final product recommendation value are ranked above the product or products with the lowest final product recommendation value. In various exemplary embodiments, the remaining selected offered products may be sorted such that the product or products with the lowest final product recommendation value are ranked above the product or products with the highest final product recommendation value.

Then, in step S370, the sorted list of the remaining selected offered products is displayed or presented to the consumer. In various exemplary embodiments, any remaining selected offered products with a final product recommendation value above a predetermined minimum value or below a predetermined maximum value are not included in the sorted list that is displayed or presented to the consumer. Then, in step S375, the method ends.

It should be appreciated that the systems and methods of this invention may be implemented as software executing on a programmed general-purpose computer, a special purpose computer, a microprocessor, or the like. In various exemplary embodiments, the systems and methods of this invention may be implemented as a routine embedded in a network client, as a resource residing on a network server, or the like. The systems and methods of this invention may also be implemented by incorporation into a software and/or hardware system, such as the hardware or firmware systems of another personal digital assistant, bi directional pager, analog or digital cellular telephone, or the like.

Thus, in summary, the systems and methods of this invention may be implemented on a programmed general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 3, can be used to implement the systems and methods of this invention.

While this invention has been described in conjunction with the exemplary embodiments outlined above, the foregoing description of exemplary embodiments of the invention, as set forth above, are intended to be illustrative, not limiting and the fundamental invention should not be considered to be necessarily so constrained. It is evident that the invention is not limited to the particular variation set forth and many alternatives, adaptations modifications, and/or variations will be apparent to those skilled in the art. For example, the method for recommending products in a specific category, based on a specific consumer profile, as described herein, may be used to recommend other products to consumers, based on specific consumer and product profiles.

Furthermore, where a range of values is provided, it is understood that every intervening value, between the upper and lower limit of that range and any other stated or intervening value in that stated range is encompassed within the invention. The upper and lower limits of these smaller ranges may independently be included in the smaller ranges and is also encompassed within the invention, subject to any specifically excluded limit in the stated range. Where the stated range includes one or both of the limits, ranges excluding either or both of those included limits are also included in the invention.

It is to be understood that the phraseology of terminology employed herein is for the purpose of description and not of limitation. Unless defined otherwise, all technical and scientific terms used herein have the same meaning as commonly understood by one of ordinary skill in the art to which this invention belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the invention, such that others may, by applying current knowledge, change, vary, modify, and/or adapt these exemplary embodiments for various applications without departing from the spirit and scope of the invention. Any and all such changes, variations, modifications, and/or adaptations should and are intended to be comprehended within the meaning and range of equivalents of the disclosed exemplary embodiments and may be substituted without departing from the true spirit and scope of the invention.

What is claimed is:

1. A method for recommending, via a computer system having a processor and a memory, one or more products or services to a consumer, comprising the computer system performing the steps of:

causing said computer system to access a product/service profile, wherein said product/service profile contains at least some product/service information for each product/service in said product/service profile, wherein said product/service information includes at least some inherent product/service information and at least some subjective product/service evaluation information, wherein said subjective product/service evaluation information includes at least some information that is different from said inherent product/service information;

causing said computer system to provide expert product evaluation information gained from an expert system's subjective evaluation of each product's or service's suitability for specific consumers, wherein said expert system's subjective evaluation of each product's or service's suitability for specific consumers considers objective characteristics specific to each product or service, from said specific consumers, in selection of specific expert system recommendation, wherein said subjective product/service evaluation information consists of said expert product evaluation information, wherein said expert system's subjective evaluation of each product's or service's suitability for a specific consumer is based on certain evaluation criteria by which one or more products or services are to be evaluated, and wherein said evaluation criteria by which each product or service is evaluated is stored and/or updated in an expert database;

causing said computer system to access at least one first consumer profile, wherein said first consumer profile contains at least some consumer profile information;

causing said computer system to allow a consumer to request, via a computer, information regarding a specific product/service from said product/service profile;

causing said computer system to select, via a computer processor, all products or services in said product/service profile, regardless of said product/service requested by said consumer;

causing said computer system to remove from said selected products or services, via said computer processor, all of said products or services that are not included in a similar product/service area with said product/service requested by said consumer;

causing said computer system to establish an initial product/service recommendation value for each of said remaining selected products or services based on said inherent product/service information;

identifying a deficiency in said consumer profile information in said at least one first consumer profile such that at least some additional consumer profile information is needed to produce a final recommendation value for each of said remaining selected products or services;

causing said computer system to access, when said deficiency in said consumer profile information is identified, at least one second consumer profile, wherein said second consumer profile comprises a pre-existing account or profile, maintained separately from said at least one first consumer profile, wherein said pre-existing account or profile comprises an online social network or online marketplace platform maintained by a separate third-party entity, which contains at least some previously stored, supplemental consumer profile information for said specific consumer, wherein said supplemental consumer profile information includes at least some consumer profile information that is different from said consumer profile information in said first consumer profile;

causing said computer system to retrieve, from said at least one second consumer profile, at least some additional consumer profile information to supplement said identified deficiency in said consumer profile information in said at least one first consumer profile;

causing said computer system to include said additional consumer profile information with said consumer profile information in said first consumer profile;

causing said computer system to transform said initial product/service recommendation value for each of said remaining selected products or services based on a comparison of said subjective product/service evaluation information from said expert database and at least some consumer profile information and/or supplemental consumer profile information for said specific consumer to produce said final recommendation value for each of said remaining selected products or services;

causing said computer system to create a ranked list of said remaining selected products or services by ranking said remaining selected products or services by each remaining selected product's or service's final recommendation value;

causing said computer system to transform data regarding at least a portion of said ranked list of said remaining selected products or services into at least one displayable representation of said data regarding said ranked list of said remaining selected products or services;

and causing said computer system to display at least a portion of said at least one displayable representation of said data regarding said ranked list of said remaining selected products or services to said consumer.

2. The method of claim 1, wherein two or more of said product/service profile, said at least one first consumer profile, and said at least one second consumer profile are contained within a single database.

3. The method of claim 1, further comprising causing said computer system to remove, if said consumer profile information for said specific consumer indicates that said specific consumer matches to products or services that contain specific content with an indicated other preference, via said computer processor, all of said remaining selected products or services that do not match said indicated other preference, wherein information regarding said indicated other preference is included in said consumer profile information or said supplemental consumer profile information, and wherein information regarding said specific content of each product/service is included in said inherent product/service information or said subjective product/service evaluation information.

4. The method of claim 1, wherein said inherent product/service information includes one or more of each product's or service's name or title, manufacturer, distributor, supplier, price, availability, at least one product/service keyword, and the like.

5. The method of claim 1, wherein said subjective evaluation of each product's or service's suitability for a specific consumer is based on certain predetermined evaluation criteria by which one or more products or services are to be evaluated.

6. The method of claim 1, wherein at least some of said consumer profile information and at least some of said product/service information contain similar types of information, such that at least particular parameters of said products or services may be matched to at least certain characteristics of said consumer.

7. A product recommendation system comprising:
a computer system comprising a server or its equivalent;
at least one consumer computer, wherein said at least one consumer computer is linked, via a distributed network, to said server;
and at least one management computer, wherein said at least one management computer is linked, via a distributed network, to said server;
wherein said server includes at least some of a product profile in a database for storing and/or updating product information for a plurality of products, wherein said product profile contains at least some product information for each product in said product profile, wherein said product information includes at least some inherent product information and at least some subjective product evaluation information, wherein said subjective product evaluation information includes at least some information that is different from said inherent product information in said product profile;
wherein said product recommendation system causes said computer system to provide expert product evaluation information gained from an expert system's subjective evaluation of each product's or service's suitability for specific consumers, wherein said expert system's subjective evaluation of each product's or service's suitability for specific consumers considers objective characteristics specific to each product or service in selection of specific expert system recommendation, wherein said expert system's subjective evaluation from said specific consumers, and wherein said subjective product evaluation information includes said expert product evaluation information, a criteria portion of a database for storing and/or updating evaluation criteria by which a product is evaluated;

an expert portion of a database for storing and/or updating said expert system's subjective product evaluation information, wherein said expert system's subjective evaluation of each product's or service's suitability for a specific consumer is based on certain evaluation criteria by which one or more products or services are to be evaluated;

at least one first consumer profile in a database for storing and/or updating consumer profile information for a plurality of consumers;

at least one second consumer profile in a database, wherein said second consumer profile comprises a pre-existing account or profile maintained separately from said at least one first consumer profile, wherein said pre-existing account or profile comprises an online social network or online marketplace platform maintained by a separate third-party entity, which contains at least some previously stored, supplemental consumer profile information, wherein said supplemental consumer profile information includes at least some consumer profile information that is different from said consumer profile information in said first consumer profile;

and wherein said product recommendation system causes said computer system to identify a deficiency in said consumer profile information;

wherein said product recommendation system causes said computer system to retrieve, from said at least one second consumer profile, at least some additional consumer profile information to supplement said identified deficiency in said consumer profile information in said at least one first consumer profile;

wherein said product recommendation system causes said computer system to include said additional consumer profile information with said consumer profile information in said first consumer profile.

8. The product recommendation system of claim 7, further including a plurality of consumer computers, wherein each consumer computer is linked, via said distributed network, to said server.

9. The product recommendation system of claim 7, wherein said product information comprise both inherent product information and subjective product evaluation information regarding each of a plurality of products.

10. The product recommendation system of claim 7, wherein said inherent product information includes one or more of each product's name or title, manufacturer, distributor, supplier, price, availability, at least one product keyword, and the like.

11. The product recommendation system of claim 7, wherein said subjective product evaluation information includes at least some subjective information regarding each product.

12. The product recommendation system of claim 7, wherein at least some of said consumer profile information and at least some of said product information contain similar types of information, such that at least particular parameters of said products may be matched to at least certain characteristics of said consumer.

13. A method for providing at least some expert product evaluation information, comprising a computer system performing the steps of:

causing said computer system to receive at least some initial information from a consumer, wherein said initial information includes at least some access information for accessing pre-existing information in a pre-existing portion of a database;

identifying a deficiency in said initial information from said consumer;

causing, as a result of identifying a deficiency in said initial information, said computer system to access said pre-existing information in said pre-existing portion of a database using said access information;

causing said computer system to retrieve at least some pre-existing information from said pre-existing portion of a database to supplement said identified deficiency in said initial information;

causing said computer system to create a consumer profile using at least some of said initial information and at least some of said pre-existing information;

causing said computer system to correlate said consumer profile with at least some of a product profile, wherein said product profile contains at least some product information for each product in said product profile, wherein said product information includes at least some inherent product information and at least some subjective product evaluation information, wherein said subjective product evaluation information is included in an expert database and includes at least some information that is different from said inherent product information in said product profile; and causing said computer system to allow an expert system to provide expert product evaluation information gained from said expert system's subjective evaluation of each product's or service's suitability for specific consumers, wherein said expert system's subjective evaluation of each product's or service's suitability for specific consumers considers objective characteristics specific to each product or service in selection of specific expert system recommendation, wherein said subjective product evaluation information includes said expert product evaluation information, and wherein said subjective product evaluation information is based on certain evaluation criteria by which one or more products or services are to be evaluated, and wherein said evaluation criteria by which each product or service is evaluated is stored and/or updated in said expert database.

14. The method of claim 13, further comprising causing said computer system to request supplemental information from said consumer and supplement said consumer profile to include said supplemental information if said supplemental information is received from said consumer.

15. The method of claim 13, further comprising causing said computer system to request supplemental information from said consumer, in response to a request from said consumer for a particular product/service.

16. The method of claim 1, wherein said subjective product/service evaluation information includes information regarding each product's or service's attributes and/or benefits.

17. The method of claim 1, further comprising causing said computer system to allow said consumer to add, via a computer, additional information regarding an available product/service, either previously existing in or newly provided to, said product/service profile.

18. The method of claim 13, further comprising causing said computer system to allow said consumer to add, via a computer, additional information regarding an available product/service, either previously existing or newly provided to, said consumer profile.

\* \* \* \* \*